Figure 1:
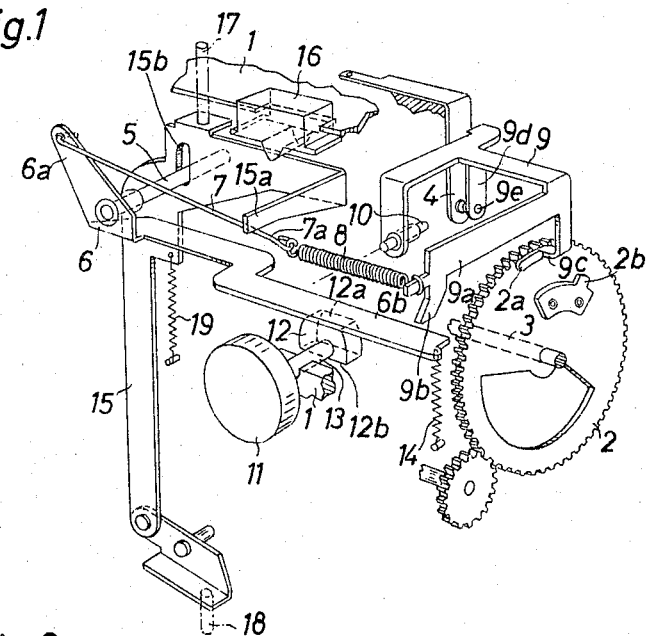

Sept. 6, 1966    K. NEUDECKER ETAL    3,271,098
ASSEMBLY FOR SELECTIVELY OPERATING AN APPARATUS SUCH AS
A MOTION PICTURE APPARATUS, IN DIFFERENT WAYS
Filed March 12, 1964

INVENTORS
KARL NEUDECKER
JOHANN ZANNER

BY   Michael J. Striker
         N.H.

United States Patent Office
3,271,098
Patented Sept. 6, 1966

3,271,098
ASSEMBLY FOR SELECTIVELY OPERATING AN APPARATUS SUCH AS A MOTION PICTURE APPARATUS, IN DIFFERENT WAYS
Karl Neudecker, Munich, and Johann Zanner, Unterhaching, near Munich, Germany, assignors to Agfa Aktiengesellschaft, Leverkusen, Germany
Filed Mar. 12, 1964, Ser. No. 351,283
Claims priority, application Germany, Mar. 15, 1963,
A 42,607
7 Claims. (Cl. 352—169)

The present invention relates to devices which are capable of being operated in a plurality of different ways and in particular to the structure which controls such devices so that the operator can select one of a plurality of different types of operation.

As an example of such devices, there are motion picture apparatus which may be operated so as to expose, in the case of a camera, a selected number of frames per second or a single frame, or in the case of projectors a selected number of frames per second can be projected.

It is a primary object of the present invention to provide an exceedingly simple rugged structure which enables the operator to select in an extremely convenient manner the particular type of operation which is desired and which will then enable the operator to operate the apparatus in such a way that the selected type of operation will be carried out.

In particular, it is an object of the present invention to provide a construction where a single control means controls the type of operation which will be produced and where additional structure is selectively placed by the operator in a position which will determine the manner in which the control means is operated.

Yet another object of the present invention is to provide a structure where a single spring acts to maintain all of the parts in their operating positions as well as to urge the parts to their rest position.

Furthermore, it is an object of the present invention to provide a structure which can very easily be adjusted to regulate the manner in which components of the structure operate.

With these objects in view the invention includes, in an assembly for selectively operating an apparatus, such as a motion picture apparatus, in different ways, this assembly of the invention including a support means and a control means carried by the support means for movement from a rest position to either one of a pair of operating positions which respectively provide different types of operation for the apparatus. A positioning means is carried by the support means for movement between a pair of locations both of which are located in the path of movement of the control means so as to determine which one of the operating positions will be assumed thereby, and a manually operable selecting means engages the positioning means to selectively position the latter in one of the other of these locations so as to determine in this way which of the operating positions will be assumed by the control means. A manually operable actuating means is available for starting the operations, and a motion-transmitting means is operatively connected to the control means and is engaged by the manually operable actuating means to transmit movement thereof to the control means so as to displace the latter from its rest position to that one of the operating positions which is determined by the selected location of the positioning means.

Figure 2:
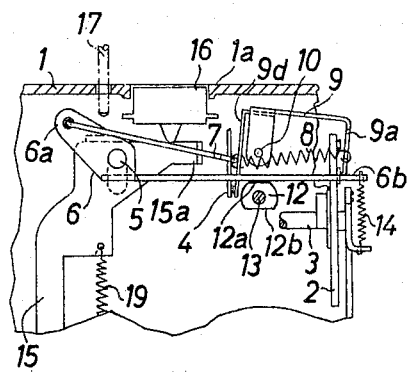

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a perspective illustration of one possible embodiment of a structure according to the present invention, FIG. 1 showing the structure of the invention associated with only so much of a motion picture apparatus which is required for the complete understanding of the invention, and the parts are shown in FIG. 1 in their rest position; and FIG. 2 shows in a side elevation part of the structure of FIG. 1 displaced from the rest position of FIG. 1 to an operating position.

Referring to the drawings, there is fragmentarily illustrated therein part of a housing 1 of a motion picture camera provided with a rotary shutter 2 which is driven by a shaft 3 connected through a suitable transmission to an electric motor the circuit of which includes the switch element 4. The housing 1 forms part of a support means for the structure of the invention, and this support means includes an elongated stationary shaft 5 which serves to pivotally support a positioning means formed by the elongated two-armed lever 6 which has the arms 6a and 6b. An elongated bendable rod 7, in the form of a suitable wire, for example, is pivotally connected at its left end, as viewed in FIGS. 1 and 2, to the arm 6a of the positioning lever 6 and the other end 7a of the rod 7 is fixed to one end of an elongated spring 8 which together with the rod 7 forms a motion-transmitting means, as described below. The spring 8 is connected at its end distant from the rod 7 to an arm 9a of a substantially U-shaped tilt-lever 9 which forms a control means of the invention and which is supported for turning movement by a stationary shaft 10 which also forms part of a support means. This tilt-lever 9 has at its arm 9a a pair of lugs 9b and 9c while a second arm 9d carries a contact 9e which forms another switch element cooperating with the switch element 4 to form therewith a switch located in the circuit of the electric motor which drives the shaft 3, as referred to above.

The structure of the invention also includes a manually operable selecting means formed by a cam 12 fixed to a shaft which is supported for rotary movement by the support means formed by the housing 1, for example, and this shaft 13 extends through an opening of the housing 1 to be supported for rotary movement in this opening, and at the exterior of the housing 1 the shaft 13 fixedly carries a knob 11 which is accessible to the operator for turning the selecting cam 12 between a pair of positions where a pair of flat surface portions 12a and 12b thereof are adapted to engage the underside of the arm 6b of the positioning lever 6. In the position of the parts shown in FIGS. 1 and 2 the relatively flat surface portion 12a is shown engaging the underside of the lever 6, and it is to be noted that the distance of these flat surfaces 12a and 12b from the shaft 13 are unequal so that depending upon which of these surfaces engages the underside of the lever 6 this lever 6 will be situated in one or the other of a pair of different locations.

In the rest position of the structure the arm 6b is urged against the upper surface of the cam 12 by the spring 8 which acts through the rod 7 on the lever 6 to urge the latter to turn in a clockwise direction urging the arm 6b downwardly against the cam 12, and although not necessary a relatively light spring 14 may be provided to augment this action. When the surface 12a of the selecting cam 12 engages the arm 6b the free end of the arm 6b is situated at an elevation higher than when the surface 12b engages the arm 6b. The outer free end portion of the arm 6b acts as a stop for the movement of the tilt-lever 9, the lug 9b engaging the arm 6b when the apparatus is operated, and it will be noted that in both of its locations the arm 6b of the lever 6 is situated in the path of movement of the lug 9b and will engage the latter either sooner or later depending upon the position of the lever 6 which is selected by the selecting means 11–13.

A manually operable actuating means 15 is provided for setting the structure into operation, and it will be seen that this manually operable actuating means 15 is formed with an elongated slot through which the shaft 5 passes and has an arm 15a located over and engaging the rod 7. A key 16 extends through an opening in the wall of the housing 1 so as to be accessible to the operator for displacing the actuating means 15 in order to set the structure into operation. A cable release 17 is also provided for displacing the actuating means 15 instead of the key 16, so that in this way the structure can be set into operation by way of the cable 17 rather than by way of depression of the key 16, and in addition in the case of a camera a pistol-type of grip can be provided with a structure similar to a trigger which the operator depresses so as to move a pin 18 upwardly to displace the lever shown at the bottom of FIG. 1 in a counterclockwise direction thus displacing the actuating means 15 downwardly to initiate the operations in this way if desired. Irrespective of which of the several means 16–18 are used to move the actuating means 15 downwardly, the arm 15a will deflect the rod 7 downwardly, and this deflection will be transmitted through the spring 8 to the tilt-lever 9 to displace the latter in a clockwise direction, as viewed in FIGS. 1 and 2, from the rest position shown in FIG. 1 to that one of the operating positions which is determined by the location of the arm 6b of the lever 6 selected by the turning of the knob 11 in the manner described above. Thus, it will be seen that the elements 7 and 8 form a motion-transmitting means for transmitting movement of the actuating means 15 to the control means 9. The deflection of the rod 7 will act through the spring 8 to turn the lever 9 until the lug 9b engages the lever arm 6b.

In the illustrated example the shutter 2 is provided with a pair of control projections 2a and 2b. In the rest position of the parts shown in FIG. 1 the projection 2a engages the lug 9c so that the shutter 2 could not turn even if the motor were running and were attempting to turn the shutter 2 in a clockwise direction, as viewed in FIG. 1. However, in the rest position of the parts the contact 9e carried by the lug 9d is spaced from the contact 4 so that the switch of the motor circuit is opened and the motor is unenergized. When the operation is stopped the control projection 2a will engage the lug 9c so as to terminate the rotation of the shutter 2. Upon downward movement of the manually operable actuating means 15 the downward deflection of the rod 7 acts through the spring 8 to turn the control means 9 from its illustrated rest position in a clockwise direction displacing the lug 9c away from the control projection 2a, and at the same time the contact 9e moves into engagement with the contact of the switch element 4 so that the circuit of the electric motor is closed and now the shutter 2 starts to rotate.

In the illustrated position the operator has selected that location of the cam 12 which will provide continuous operation to make a series of exposures, and in this position the lever arm 6b is closer to the tilt-lever 9, when the latter is in its rest position, than when the operator has selected to place the surface 12b of the cam 12 next to the underside of the arm 6b. Thus, with the illustrated selection the control means 9 will turn until its lug 9b engages the arm 6b of the positioning means 6, and the clockwise turning of the control means or tilt-lever 9 displaces the lug 9c forwardly and downwardly from the control projection 2a so as to release the shutter for rotation, but the movement of the lever 9 is terminated by engagement of the lug 9b with the arm 6b before the lug 9c can move into the path of rotation of the control projection 2b which is fixed to the shutter 2 for rotation therewith, and as a result as long as the operator maintains the actuating means 15 in its depressed condition, as by manual depression of the key 16, the apparatus will operate continuously. When it is desired to stop the operation the operator will simply release the actuating means 15, as, for example, by releasing the key 16. The spring 8 will now pull the rod 7 back up toward its rest position, thus returning the actuating means 15 to its starting position, and at the same time the spring 8 will act on the lever 9 to return it to the rest position shown in FIG. 1 where the lug 9c is in the path of turning of the control projection 2a, and also it will be noted that the switch 4, 9e of the motor automatically opens. In addition it will be seen that the spring acts through the rod 7 on the lever 6 to maintain the arm 6b in engagement with the selecting projection 12, so that the single spring 8 on the one hand urges the control means 9 to one or the other of its operating positions and on the other hand urges the lever 9 back to its rest position, urges the manually operable actuating means 15 back to its starting position, and also urges the lever 6 into engagement with the cam 12. A light spring 19 urges the actuating means 15 downwardly solely for the purpose of maintaining the arm 15a in relatively light engagement with the rod 7. This spring 19 is not essential and can be omitted. Its only purpose is to prevent, when the spring 8 returns the parts to their initial positions, the arm 15 from moving upwardly beyond the rod 7. In the same way, a completely non-essential spring 14 is provided to urge the arm 6b into engagement with the cam 12. Hereagain the spring 14 can be omitted since this spring 8 will always act to urge the lever 6 in a clockwise direction, as viewed in FIGS. 1 and 2.

Of course, the return of the tilt-lever 9 to its initial position opens the circuit of the motor and the shutter 2 turns until the control projection 2a thereof engages the lug 9c so as to stop the rotation.

If, on the other hand, the operator has turned the knob 11 to a position displaced by 180° from that shown in the drawings, the surface 12b will be directed toward the underside of the arm 6b with the result that the selecting means positions the positioning means 6 at a location where its arm 6b is more distant from the control means 9 when the latter is in its rest position, and now when the operator displaces the actuating means 15 downwardly the lever 9 will turn through a greater distance so as to first initiate the rotation of the shutter 2 and then, when the lug 9b engages the arm 6b, locate the lug 9c in the path of rotation of the control projection 2b which engages the lug 9c when the shutter 2 has turned to approximately one revolution so that in this way a single exposure is made. Upon release of the actuating means 15 it will again be returned to its starting position. The spring 8 will of course raise the lever 9 back to its rest position and at this time the shutter 2 will only be able to turn through the relatively short distance required to displace the control projection 2a into engagement with the lug 9c after the latter moves away from the control projection 2b. Between the electric motor and the shaft 3 there is a slip clutch which allows the motor to continue to operate although the control projection 2b engages the lug 9c. Of course, when the lever 9 returns to its rest position the motor stops operating. With the selecting means 11–13 remaining in this position where the surface 12b is directed toward and engages the arm 6b, the operator can repeatedly depress and release the actuating means 15 to make as many single exposures as desired.

Of course, the invention is not limited to the particular example shown in the drawing and described above. It is of course possible to arrange the control projection 2b so that in the illustrated position of the selecting means a single exposure will be provided while the movement of the control means 9 to its lower position provides continuous operation of the camera to make a series of exposures. Furthermore, it is not necessary for the shutter 2 to be directly driven from the motor. Also, the rotation of the shutter can in a known way control the operation of the claw to transport the film. As was mentioned above the springs 14 and 19 can be eliminated, particularly in the case where in the rest position of the apparatus the spring 8 extends perpendicularly to the direction of movement of the actuating means 15 and when the angle between the spring 8 and the rod 7, extending from the spring 8 toward the actuating means 15, is between 90° and 180°.

A particularly good advantage of the structure of the invention is the ease with which it can be adjusted. For example the path along which the actuating means 15 moves can have its length adjusted, which is to say the length of movement of the actuating means 15, or the distance through which it moves, can be adjusted by bending the rod 7 so that with a suitable curvature the rod 7 itself will determine the extent of movement of the actuating means 15.

A further feature of the invention resides in adjusting the path of movement of the actuating means 15 in such a way that the tilt-lever 9 does not reach the first of its operating positions, where the lug 9b engages the lever 6 with its arm 6b in the illustrated position, until the key 16 has been displaced slightly behind the exterior surface of the housing 1, as indicated in FIG. 2. In this way if the operator should happen to place the camera on a table or the like with the key 16 directed downwardly so that the weight of the camera tends to depress the key 16, it will not be possible for the key 16 to be depressed to an extent which will start the operations through such careless placing of the camera on a supporting surface. By adjusting the rod 7 to provide for the actuating means 15 an extent of movement requiring the key 16 to be displaced at least slightly beneath the exterior surface of the housing 1, it is guaranteed that the operations will take place only when the operator manually depresses the key 16. The structure of the invention can be used not only with motion picture cameras but also with recording cameras as well as with still cameras provided with devices for automatically making a series of exposures, and of course the structure can be used with motion picture projectors and with recording devices which use elongaged strips, as well as with similar devices where the control projections 2a, 2b need not necessarily be connected to a rotary shutter but where there is no shutter can be provided on a control disc which is especially provided for the purpose of carrying the control projections 2a and 2b.

It will be understood that each of the elements described above, or two or more together, may also find a useful application in other types of devices operable in different ways differing from the types described above.

While the invention has been illustrated and described as embodied in assembly for selecting a particular type of operation of a device which can be operated in different ways, it is not intended to be limited to the details shown, since various modifications and structural changes may be made without departing in any way from the spirit of the present invention as defined in the claims.

What is claimed as new and desired to be secured by Letters Patent is:

1. In an assembly for selectively operating an apparatus, such as a motion picture apparatus, in different ways, in combination, support means; control means carried by said support means for movement on a rest position to one of a pair of operating positions which respectively provide different types of operation of the apparatus, said control means moving through one of said operating positions thereof before reaching the other of said operating positions thereof; a positioning lever turnably carried by said support means for movement between a pair of locations in which said lever is situated in the path of movement of said conttrol means from said rest position to said operating positions thereof and said lever in one of said locations being located nearer to said control means, when the latter is in said rest position thereof, than when said lever is in the other of said locations thereof; manually operable selecting means engaging said lever for placing the latter in one or the other of said locations, said lever when in said one location arresting the movement of said control means when it reaches said one operating position and when in the other of said locations arresting the movement of said control means after it has moved through said one operating position to the other of said operating positions; manually operable actuating means for initating the movement of said control means from said rest position thereof to one or the other of said operating positions; and motion-transmitting means operatively connected to said control means and engaged by said actuating means for displacing said control means from said rest position to one or the other of said operating positions upon operation of said actuating means by the operator, said motion-transmitting means including an elongated rod pivotally connected at one end to said positioning lever and an elongated coil spring connected to the end of said rod distant from said lever and having an end distant from said rod and connected to said control means, said rod being located in the path of movement of said actuating means to be deflected thereby to transmit movement of said actuating means through said spring to said control means to displace the latter from said rest position to that one of said operating positions determined by the location of said positioning lever which has been selected by said selecting means.

2. In an assembly for selectively operating an apparatus, such as a motion picture apparatus, in different ways, in combination, support means; control means carried by said support means for movement from a rest position to one of a pair of operating positions which respectively provide different types of operation of the apparatus, said control means including a tilt-lever turnably carried by said support means for movement from said rest position to one of said operating positions and through and beyond said one operating position to the other of said operating positions; a positioning lever turnably carried by said support means for movement between a pair of locations in both of which said positioning lever is located in the path of movement of said tilt-lever to determine whether the latter will assume said one or said other operating position, said positioning lever in one of said locations being located nearer to said tilt-lever than in the other of said locations and when in said one location arresting the movement of said tilt-lever when the latter reaches said one operating position while when in the other of said locations arresting the movement of said tilt-lever only when the latter has been displaced to said other operating position; manually operable selecting means engaging said positioning lever for selectively placing the latter in one or the other of said locations thereof so as to determine which of said operating positions will be assumed by said tilt-lever; manually operable actuating means carried by said support means for movement along a predetermined path when operated by the operator, said actuating means initiating the movement of said control means from said rest position to one or the other of said operating positions thereof; and motion-transmitting means engaged by said actuating means and operatively connected to said control means for displacing the latter from said rest position to one or the other of said operating positions upon actuation of said actuating means by the operator, said motion-transmitting means including an elongated rod pivotally connected at one end to said positioning lever and an elongated coil spring connected to the end of said rod distant from said positioning lever and having an end distant from said rod connected to said tilt-lever, said actuating means when moved by the operator along said path engaging said rod and deflecting the latter to transmit movement of said rod through said spring over to said tilt-lever for displacing the latter from said rest position to that one of said operating positions determined by the selected location of said positioning lever, said elongated coil spring extending substantially perpendicularly to said path of movement of said actuating means when said control means is in said rest position thereof.

3. In an assembly for selectively operating an apparatus, such as a motion picture apparatus, in different ways, in combination, support means; control means carried by said support means for movement from a rest position to a pair of operating positions respectively providing different types of operation of the apparatus, said control means including a tilt-lever carried by said support means for turning movement from said rest position to one of said operating positions and through and beyond said one operating position to the other of said operating positions; a positioning lever turnably carried by said support means for turning movement between a pair of locations in both of which said lever is situated in the path of movement of said tilt-lever, said positioning lever in one of said locations being closer to said tilt-lever when the latter is in said rest position than when said positioning lever is in the other of said locations and said positioning lever when in said one location arresting the movement of said tilt-lever when the latter reaches said one position while when said positioning lever is in the other of said locations said positioning lever will arrest said tilt-lever when the latter reaches said other operating position; manually operable selecting means carried by said support means and engaging said positioning lever for selectively positioning the latter in one or the other of said locations so as to determine which of said operating positions will be assumed by said tilt-lever when the latter is displaced from said rest position thereof; manually operable actuating means carried by said support means for movement along a predetermined path when operated by the operator; and motion-transmitting means operatively connected to said tilt-lever and engaged by said actuating means for displacing said tilt-lever from said rest position to one or the other of said operating positions upon operation of said actuating means by the operator, said motion-transmitting means including an elongated rod pivotally connected at one end to said positioning lever and an elongated coil spring connected to an end of said rod which is distant from said positioning lever and having an end distant from said rod and connected to said tilt-lever, said actuating means engaging said rod during operation of said actuating means to deflect said rod and to transmit movement of said rod through said spring to said tilt-lever for displacing the latter to that one of said positions which is determined by the location of said positioning lever selected by said selecting means, said spring and rod including between themselves when said tilt-lever is in said rest position an angle of between 90° and 180°.

4. In an assembly for selectively operating an apparatus, such as a motion picture apparatus, in different ways, in combination, support means; control means carried by said support means for movement from a rest position to either one of a pair of operating positions respectively providing different types of operation of the apparatus, said control means including a tilt-lever carried by said support means for turning movement from a rest position to one of said operating positions and through and beyond said one operating position to the other of said operating positions; an elongated, two-armed positioning lever turnably carried by said support means for movement between a pair of locations where one of said arms of said positioning lever is in the path of movement of said tilt-lever, said one arm in one location of said positioning lever being nearer to said tilt-lever when the latter is in said rest position than in the other of said locations of said positioning lever and said one arm of said positioning lever when the latter is in said one location arresting the movement of said tilt-lever when the latter reaches said one operating position while when said positioning lever is in the other of said location said one arm thereof arrest movement of said tilt-lever when the latter reaches the other of said operating positions; manually operable selecting means carried by said support means and engaging said positioning lever for selectively positioning the latter in one or the other of said locations to determine which of said operating positions will be assumed by said tilt-lever; manually operable actuating means carried by said support means for movement along a predetermined path when operated by the operator; and motion-transmitting means operatively connected to said tilt-lever and engaged by said actuating means for transmitting movement of the latter to said tilt-lever, said motion-transmitting means including an elongated rod pivotally connected at one end to the other of said arms of said positioning lever and a spring connected to an end of said rod distant from said positioning lever and also connected to said tilt-lever, said rod being located in the path of movement of said actuating means to be deflected thereby for transmitting movement of said rod by said actuating means through said spring to said tilt-lever for displacing the latter to one or the other of said operating positions determined by the location of said positioning lever selected by said selecting means.

5. In an assembly as recited in claim 4, said selecting means including a rotary cam engaging said one arm of said positioning lever and having a pair of angular positions respectively situating said positioning lever at said locations.

6. In an assembly for selectively operating an apparatus, such as a motion picture apparatus, in different ways, in combination, support means; control means carried by said support means for movement from a rest position to one of a pair of operating positions respectively providing different types of operation of the apparatus, said control means including a tilt-lever turnably carried by said support means for turning movement from a rest position to one operating position and through and beyond said one operating position to another operating position where said different types of operation are respectively provided by said control means; positioning means carried by said support means for movement between a pair of locations where said positioning means is located in the path of movement of said tilt-lever, one of said locations being nearer to said tilt-lever when the latter is in said rest position than the other of said locations and said positioning lever when in said one location arresting the movement of said tilt-lever when the latter reaches said one position while when said positioning lever is in said other location said lever will arrest the movement of said tilt-lever when the latter reaches said other operating position thereof; manually operable selecting means carried by said support means and engaging said positioning lever for respectively positioning the latter at one or the other of said locations so as to determine which of said operating positions will be assumed by said tilt lever; manually operable actuating means carried by said support means for movement along a predetermined path; and motion-transmitting means operatively connected to said tilt-lever and engaged by said actuating means for transmitting movement of the latter to said tilt lever to displace the latter from said rest position to that one of said operating positions which is determined by the location of said positioning lever selected by said selecting means, said motion-transmitting means including an elongated bendable rod having a pair of opposed ends, one of which is pivotally connected to said positioning lever and an elongated spring connected to the other of the ends of said rod and having, distant from said rod, an end connected to said tilt-lever, said rod being located in the path of movement of said actuating means to be deflected by the latter and to transmit movement through said spring to said tilt-lever and said rod being bendable for determining the extent of movement of said actuating means for displacing said tilt-lever from said rest position to one of the other of said operating positions.

7. In an assembly for selectively operating an apparatus, such as a motion picture apparatus, in different ways, in combination, support means; control means carried by said support means for movement from a rest position to one of a pair of operating positions respectively providing different types of operation for the apparatus; positioning means carried by said support means for movement between a pair of locations located in the path of movement of said control means from said rest position to determine which of said operating positions will be assumed thereby; manually operable selecting means carried by said support means and engaging said positioning means for selectively placing the latter in one or the other of said locations so as to determine which of said operating positions will be assumed by said control means; manually operable actuating means carried by said support means for movement along a given path when operated by the operator, said actuating means being displaceable by the operator from a given starting position; and motion-transmitting means operatively connected to said control means and engaged by said actuating means to transmit movement of the latter to said control means to displace the latter to that one of said operating positions determined by the location of said positioning means, said motion-transmitting means including an elongated rod connected to said positioning means and an elongated spring connected to said rod and to said control means, said rod being engaged by said actuating means to be deflected thereby and transmit movement through said spring to said control means, said spring acting through said rod on said actuating means to return the latter to said starting position thereof and on said positioning means to maintain the latter in engagement with said selecting means, and said spring acting on said control means to urge the latter to said rest position thereof.

References Cited by the Examiner
UNITED STATES PATENTS

| | | | |
|---|---|---|---|
| 2,943,532 | 7/1960 | Hashimoto | 352—169 |
| 3,106,126 | 10/1963 | Kirk | 352—169 |

NORTON ANSHER, *Primary Examiner.*

WILLIAM MISIEK, *Examiner.*